United States Patent
Mazumdar et al.

(10) Patent No.: US 9,214,862 B2
(45) Date of Patent: Dec. 15, 2015

(54) SYSTEMS AND METHODS FOR VALLEY SWITCHING IN A SWITCHING POWER CONVERTER

(71) Applicant: Cirrus Logic, Inc., Austin, TX (US)

(72) Inventors: Poornima Mazumdar, Austin, TX (US); Mohit Sood, Cedar Park, TX (US); Rahul Singh, Austin, TX (US); Sahil Singh, Austin, TX (US)

(73) Assignee: Philips International, B.V., Eindhoven (NL)

( * ) Notice: Subject to any disclaimer, the term of this patent is extended or adjusted under 35 U.S.C. 154(b) by 0 days.

(21) Appl. No.: 14/495,564

(22) Filed: Sep. 24, 2014

(65) Prior Publication Data

US 2015/0303796 A1    Oct. 22, 2015

Related U.S. Application Data

(60) Provisional application No. 61/980,789, filed on Apr. 17, 2014.

(51) Int. Cl.
*H02M 3/156* (2006.01)
*H02M 1/00* (2007.01)

(52) U.S. Cl.
CPC ...... *H02M 3/156* (2013.01); *H02M 2001/0054* (2013.01)

(58) Field of Classification Search
CPC ............... H02M 1/4225; H02M 1/32; H02M 2001/0009; H02M 3/0032
See application file for complete search history.

(56) References Cited

U.S. PATENT DOCUMENTS

| 3,790,878 A | 2/1974 | Brokaw |
| 4,677,366 A | 6/1987 | Wilkinson et al. |

(Continued)

FOREIGN PATENT DOCUMENTS

| CN | 103066872 A | 4/2013 |
| EP | 0536535 A1 | 4/1993 |

(Continued)

OTHER PUBLICATIONS

Balogh, Laszlo et al.; "Power-Factor Correction with Interleaved Boost Converters in Continuous-Inductor-Current Mode"; IEEE (0-7803-0982-0/93); 1993; pp. 168-174.

(Continued)

*Primary Examiner* — Jeffrey Gblende
*Assistant Examiner* — Yusef Ahmed
(74) *Attorney, Agent, or Firm* — Jackson Walker L.L.P.

(57) ABSTRACT

A controller may be configured to generate a control signal to activate and deactivate a switch of a switching power converter in order to control a switching period and a peak current of the switching power converter to maintain a regulated current of the switching power converter at a desired current level such that: if the switching period decreases below a minimum switching period, the controller increases the switching period by a ringing period of a voltage of the switch and increases the peak current to compensate for the increase of the switching period in order to maintain the regulated current, and if the peak current increases above a maximum peak current, the controller decreases the switching period by a ringing period of the voltage of the switch and decreases the peak current to compensate for the decrease of the switching period in order to maintain the regulated current.

12 Claims, 8 Drawing Sheets

(56) References Cited

U.S. PATENT DOCUMENTS

| | | |
|---|---|---|
| 4,683,529 A | 7/1987 | Bucher, II |
| 4,737,658 A | 4/1988 | Kronmuller et al. |
| 4,739,462 A | 4/1988 | Farnsworth et al. |
| 4,937,728 A | 6/1990 | Leonardi |
| 4,940,929 A | 7/1990 | Williams |
| 4,977,366 A | 12/1990 | Powell |
| 5,001,620 A | 3/1991 | Smith |
| 5,003,454 A | 3/1991 | Bruning |
| 5,055,746 A | 10/1991 | Hu et al. |
| 5,109,185 A | 4/1992 | Ball |
| 5,173,643 A | 12/1992 | Sullivan et al. |
| 5,264,780 A | 11/1993 | Bruer et al. |
| 5,278,490 A | 1/1994 | Smedley |
| 5,383,109 A | 1/1995 | Maksimovic et al. |
| 5,424,932 A | 6/1995 | Inou et al. |
| 5,430,635 A | 7/1995 | Liu |
| 5,479,333 A | 12/1995 | McCambridge et al. |
| 5,481,178 A | 1/1996 | Wilcox et al. |
| 5,565,761 A | 10/1996 | Hwang |
| 5,638,265 A | 6/1997 | Gabor |
| 5,691,890 A | 11/1997 | Hyde |
| 5,747,977 A | 5/1998 | Hwang |
| 5,757,635 A | 5/1998 | Seong |
| 5,764,039 A | 6/1998 | Choi et al. |
| 5,783,909 A | 7/1998 | Hochstein |
| 5,798,635 A | 8/1998 | Hwang et al. |
| 5,808,453 A | 9/1998 | Lee et al. |
| 5,874,725 A | 2/1999 | Yamaguchi |
| 5,960,207 A | 9/1999 | Brown |
| 5,994,885 A | 11/1999 | Wilcox et al. |
| 6,043,633 A | 3/2000 | Lev et al. |
| 6,084,450 A | 7/2000 | Smith et al. |
| 6,091,233 A | 7/2000 | Hwang et al. |
| 6,160,724 A | 12/2000 | Hemena et al. |
| 6,229,292 B1 | 5/2001 | Redl |
| 6,259,614 B1 | 7/2001 | Ribarich et al. |
| 6,300,723 B1 | 10/2001 | Wang et al. |
| 6,304,066 B1 | 10/2001 | Wilcox et al. |
| 6,304,473 B1 | 10/2001 | Telefus et al. |
| 6,343,026 B1 | 1/2002 | Perry |
| 6,356,040 B1 | 3/2002 | Preis et al. |
| 6,445,600 B2 | 9/2002 | Ben-Yaakov |
| 6,469,484 B2 | 10/2002 | L'Hermite et al. |
| 6,510,995 B2 | 1/2003 | Muthu et al. |
| 6,531,854 B2 | 3/2003 | Hwang |
| 6,580,258 B2 | 6/2003 | Wilcox et al. |
| 6,583,550 B2 | 6/2003 | Iwasa et al. |
| 6,628,106 B1 | 9/2003 | Batarseh et al. |
| 6,657,417 B1 | 12/2003 | Hwang |
| 6,696,803 B2 | 2/2004 | Tao et al. |
| 6,724,174 B1 | 4/2004 | Esteves et al. |
| 6,768,655 B1 | 7/2004 | Yang et al. |
| 6,781,351 B2 | 8/2004 | Mednik et al. |
| 6,839,247 B1 | 1/2005 | Yang et al. |
| 6,882,552 B2 | 4/2005 | Telefus et al. |
| 6,894,471 B2 | 5/2005 | Corva et al. |
| 6,933,706 B2 | 8/2005 | Shih |
| 6,940,733 B2 | 9/2005 | Schie et al. |
| 6,944,034 B1 | 9/2005 | Shteynberg et al. |
| 6,956,750 B1 | 10/2005 | Eason et al. |
| 6,975,523 B2 | 12/2005 | Kim et al. |
| 6,980,446 B2 | 12/2005 | Simada et al. |
| 7,072,191 B2 | 7/2006 | Nakao et al. |
| 7,099,163 B1 | 8/2006 | Ying |
| 7,161,816 B2 | 1/2007 | Shteynberg et al. |
| 7,221,130 B2 | 5/2007 | Ribeiro et al. |
| 7,233,135 B2 | 6/2007 | Noma et al. |
| 7,266,001 B1 | 9/2007 | Notohamiprodjo et al. |
| 7,292,013 B1 | 11/2007 | Chen et al. |
| 7,295,452 B1 | 11/2007 | Liu |
| 7,411,379 B2 | 8/2008 | Chu et al. |
| 7,554,473 B2 | 6/2009 | Melanson |
| 7,606,532 B2 | 10/2009 | Wuidart |
| 7,667,986 B2 | 2/2010 | Artusi et al. |
| 7,684,223 B2 | 3/2010 | Wei |
| 7,719,246 B2 | 5/2010 | Melanson |
| 7,719,248 B1 | 5/2010 | Melanson |
| 7,746,043 B2 | 6/2010 | Melanson |
| 7,804,480 B2 | 9/2010 | Jeon et al. |
| 7,834,553 B2 | 11/2010 | Hunt et al. |
| 7,872,883 B1 | 1/2011 | Elbanhawy |
| 7,894,216 B2 | 2/2011 | Melanson |
| 8,008,898 B2 | 8/2011 | Melanson et al. |
| 8,169,806 B2 * | 5/2012 | Sims et al. ............ 363/97 |
| 8,193,717 B2 | 6/2012 | Leiderman |
| 8,222,772 B1 | 7/2012 | Vinciarelli |
| 8,242,764 B2 | 8/2012 | Shimizu et al. |
| 8,369,109 B2 | 2/2013 | Niedermeier et al. |
| 8,441,220 B2 | 5/2013 | Imura |
| 8,536,799 B1 | 9/2013 | Grisamore |
| 8,552,893 B1 | 10/2013 | Sood et al. |
| 8,593,075 B1 * | 11/2013 | Melanson et al. ....... 315/291 |
| 8,610,364 B2 | 12/2013 | Melanson et al. |
| 8,803,439 B2 | 8/2014 | Stamm et al. |
| 8,816,593 B2 | 8/2014 | Lys et al. |
| 2003/0090252 A1 | 5/2003 | Hazucha |
| 2003/0111969 A1 | 6/2003 | Konishi et al. |
| 2003/0160576 A1 | 8/2003 | Suzuki |
| 2003/0174520 A1 | 9/2003 | Bimbaud |
| 2003/0214821 A1 | 11/2003 | Giannopoulos et al. |
| 2003/0223255 A1 | 12/2003 | Ben-Yaakov et al. |
| 2004/0046683 A1 | 3/2004 | Mitamura et al. |
| 2004/0196672 A1 | 10/2004 | Amei |
| 2005/0057237 A1 | 3/2005 | Clavel |
| 2005/0078492 A1 * | 4/2005 | Takahashi ........... 363/21.15 |
| 2005/0207190 A1 | 9/2005 | Gritter |
| 2005/0231183 A1 | 10/2005 | Li et al. |
| 2005/0237005 A1 * | 10/2005 | Maxik ................. 315/247 |
| 2005/0270813 A1 | 12/2005 | Zhang et al. |
| 2005/0275354 A1 | 12/2005 | Hausman, Jr. et al. |
| 2006/0013026 A1 | 1/2006 | Frank et al. |
| 2006/0022648 A1 | 2/2006 | Ben-Yaakov et al. |
| 2006/0209574 A1 * | 9/2006 | Makino ............... 363/21.12 |
| 2006/0214603 A1 | 9/2006 | Oh et al. |
| 2007/0076459 A1 * | 4/2007 | Limpkin ............... 363/157 |
| 2007/0103949 A1 | 5/2007 | Tsuruya |
| 2007/0176583 A1 * | 8/2007 | Hachiya et al. ......... 323/282 |
| 2007/0267978 A1 * | 11/2007 | Shteynberg et al. ..... 315/247 |
| 2008/0018261 A1 | 1/2008 | Kastner |
| 2008/0043504 A1 | 2/2008 | Ye et al. |
| 2008/0062584 A1 | 3/2008 | Freitag et al. |
| 2008/0062586 A1 | 3/2008 | Apfel |
| 2008/0117656 A1 | 5/2008 | Clarkin |
| 2008/0130336 A1 | 6/2008 | Taguchi |
| 2008/0175029 A1 | 7/2008 | Jung et al. |
| 2008/0205102 A1 * | 8/2008 | Makino et al. .......... 363/84 |
| 2008/0259655 A1 * | 10/2008 | Wei et al. ........... 363/21.18 |
| 2008/0278132 A1 | 11/2008 | Kesterson et al. |
| 2008/0310194 A1 | 12/2008 | Huang et al. |
| 2009/0058370 A1 * | 3/2009 | Odaohhara ............ 320/152 |
| 2009/0059632 A1 | 3/2009 | Li et al. |
| 2009/0067204 A1 | 3/2009 | Ye et al. |
| 2009/0108677 A1 | 4/2009 | Walter et al. |
| 2009/0184665 A1 | 7/2009 | Ferro |
| 2009/0295300 A1 | 12/2009 | King |
| 2010/0128501 A1 | 5/2010 | Huang et al. |
| 2010/0165672 A1 | 7/2010 | Li et al. |
| 2010/0208500 A1 | 8/2010 | Yan et al. |
| 2010/0238689 A1 | 9/2010 | Fei et al. |
| 2010/0244793 A1 | 9/2010 | Caldwell |
| 2011/0018515 A1 * | 1/2011 | McCloy-Stevens ....... 323/284 |
| 2011/0058285 A1 * | 3/2011 | Wibben ................ 361/18 |
| 2011/0110132 A1 | 5/2011 | Rausch et al. |
| 2011/0199793 A1 | 8/2011 | Kuang et al. |
| 2011/0267856 A1 * | 11/2011 | Pansier ................. 363/84 |
| 2011/0276938 A1 | 11/2011 | Perry et al. |
| 2011/0291583 A1 * | 12/2011 | Shen ................... 315/287 |
| 2011/0309760 A1 | 12/2011 | Beland et al. |
| 2012/0146540 A1 * | 6/2012 | Khayat et al. ........... 315/291 |
| 2012/0187997 A1 * | 7/2012 | Liao et al. ............. 327/299 |
| 2012/0242242 A1 * | 9/2012 | Linz et al. ............. 315/210 |
| 2012/0248998 A1 | 10/2012 | Yoshinaga |
| 2012/0306406 A1 | 12/2012 | Grisamore et al. |
| 2012/0320640 A1 | 12/2012 | Baurle et al. |

(56) References Cited

U.S. PATENT DOCUMENTS

| | | | |
|---|---|---|---|
| 2013/0002163 A1* | 1/2013 | He et al. | 315/228 |
| 2013/0069561 A1* | 3/2013 | Melanson et al. | 315/297 |
| 2013/0154496 A1* | 6/2013 | Maru et al. | 315/210 |
| 2013/0181635 A1 | 7/2013 | Ling | |
| 2013/0307425 A1* | 11/2013 | Yan et al. | 315/200 R |
| 2014/0009085 A1* | 1/2014 | Veskovic | 315/307 |
| 2014/0028213 A1* | 1/2014 | Sood et al. | 315/210 |
| 2014/0028214 A1* | 1/2014 | Mazumdar et al. | 315/279 |
| 2014/0198540 A1 | 7/2014 | Xu | |
| 2014/0218978 A1 | 8/2014 | Heuken et al. | |
| 2014/0252975 A1* | 9/2014 | Drakshapalli et al. | 315/210 |

FOREIGN PATENT DOCUMENTS

| | | |
|---|---|---|
| EP | 0636889 A1 | 2/1995 |
| EP | 1213823 A2 | 6/2002 |
| EP | 1289107 A3 | 3/2003 |
| EP | 1962263 A2 | 8/2008 |
| EP | 2257124 A1 | 12/2010 |
| EP | 2232949 | 11/2011 |
| EP | 2469695 A1 | 6/2012 |
| JP | 2008053181 A | 3/2008 |
| WO | WO0184697 A2 | 11/2001 |
| WO | WO2004051834 A1 | 6/2004 |
| WO | WO2006013557 A1 | 2/2006 |
| WO | WO2006022107 A1 | 3/2006 |
| WO | WO2007016373 A3 | 2/2007 |
| WO | WO2008004008 A2 | 1/2008 |
| WO | WO2008152838 A2 | 12/2008 |
| WO | WO2010011971 A1 | 1/2010 |
| WO | WO2010065598 A2 | 6/2010 |
| WO | WO2011008635 A1 | 1/2011 |

OTHER PUBLICATIONS

Ben-Yaakov, Sam et al.; "The Dynamics of a PWM Boost Converter with Resistive Input"; IEEE Transactions on Industrial Electronics, vol. 46, No. 3, Jun. 1999, pp. 613-619.

Cheng, Hung L. et al.; "A Novel Single-Stage High-Power-Factor Electronic Ballast with Symmetrical Topology"; IEEE Transactions on Industrial Electronics, vol. 50, No. 4, Aug. 2003, pp. 759-766.

Erickson, Robert W. et al.; "Fundamentals of Power Electronics", Second Edition, Chapter 6, Boulder CO 2001, pp. 131-184.

Fairchild Semiconductor, Application Note 42047, Power Factor Correction (PFC) Basics, Aug. 19, 2004, 11 pages.

Fairchild Semiconductor, Application Note 42030, Theory and Application of the ML4821 Average Current Mode PFC Controller, Aug. 1997, 19 pages.

Fairchild Semiconductor, Application Note AN4121, Design of Power Factor Correction Circuit Using FAN7527B, 2002, 22 pages.

Fairchild Semiconductor, FAN4800, Low Start-Up Current PFC/PWM Controller Combos, Nov. 2006, 20 pages.

Fairchild Semiconductor, FAN4810, Power Factor Correction Controller, Sep. 24, 2003, 14 pages.

Fairchild Semiconductor, FAN4822, ZVS Average Current PFC Controller, Aug. 10, 2001, 10 pages.

Fairchild Semiconductor, FAN7532, Ballast Control IC, Jun. 2006, 16 pages.

Fairchild Semiconductor, FAN7544, Simple Ballast Controller, 2004, 14 pages.

Fairchild Semiconductor, FAN7711, Ballast Control IC, Mar. 2007, 23 pages.

Fairchild Semiconductor, KA7541, Simple Ballast Controller, 2001, 14 pages.

Fairchild Semiconductor, ML4812, Power Factor Controller, May 31, 2001, 18 pages.

Freescale Semiconductor, AN1965, Design of Indirect Power Factor Correction Using 56F800/E, Jul. 2005, 20 pages.

Freescale Semiconductor, AN3052, Implementing PFC Average Current Mode Control using the MC9S12E128, Nov. 2005, 8 pages.

Freescale Semiconductor, Inc., Dimmable Light Ballast with Power Factor Correction, M68HC08 Microcontrollers, Dec. 2005, 72 pages. http://toolbarpdf.com/docs/functions-and-features-of-inverters.html, printed on Jan. 20, 2011.

Garcia, O., et al.; "High Efficiency PFC Converter to Meet EN61000-3-2 and A14", Industrial Electronics, 2002. ISIE 2002. Proceedings of the 2002 IEEE International Symposium on (vol. 3 ), pp. 975-980.

Hirota Atsushi et al, "Analysis of Single Switch Delta-Sigma Modulated Pulse Space Modulation PFC Converter Effectively Using Switching Power Device," IEEE, US, 2002, pp. 682-686.

Infineon, CCM-PFC Standalone Power Factor Correction (PFC) Controller in Continuous Conduction Mode (CCM), Version 2.1, Feb. 6, 2007, 22 pages.

International Rectifier, Application Note AN-1077,PFC Converter Design with IR1150 One Cycle Control IC, rev. 2.3, Jun. 2005, 20 pages.

International Rectifer, Data Sheet No. PD60230 revC, IR1150(S)(PbF), uPFC One Cycle Control PFC IC Feb. 5, 2007, 16 pages.

International Rectifier, IRAC1150-300W Demo Board, User's Guide, Rev 3.0, Aug. 2, 2005, 18 pages.

Lu et al., International Rectifier, Bridgeless PFC Implementation Using One Cycle Control Technique, 2005, 6 pages.

Lai, Z., et al., A Family of Power-Factor-Correction Controllers, Twelfth Annual Applied Power Electronics Conference and Exposition, vol. 1, Feb. 23, 1997-Feb. 27, 1997, pp. 66-73.

Lee, P. et al., Steady-State Analysis of an Interleaved Boost Converter with Coupled Inductors, IEEE Transactions on Industrial Electronics, vol. 47, No. 4, Aug. 2000, pp. 787-795.

Linear Technology, LT1248, Power Factor Controller, Apr. 20, 2007, 12 pages.

Linear Technology, "Single Switch PWM Controller with Auxiliary Boost Converter," LT1950 Datasheet, Linear Technology, Inc. Milpitas, CA, 2003, 20 pages.

Madigan, M. et al., Integrated High-Quality Rectifier-Regulators, IEEE Transactions on Industrial Electronics, vol. 46, No. 4, Aug. 1999, pp. 749-758.

Maksimovic, Regan Zane and Robert Erickson, Impact of Digital Control in Power Electronics, Proceedings of 2004 International Symposium on Power Semiconductor Devices & Ics, Kitakyushu, Apr. 5, 2010, Colorado Power Electronics Center, ECE Department, University of Colorado, Boulder, CO, 10 pages.

Mamano, Bob, "Current Sensing Solutions for Power Supply Designers", Unitrode Seminar Notes SEM1200, 1999, 36 pages.

Miwa B.A. et al., High Efficiency Power Factor Correction Using Interleaved Techniques, Applied Power Electronics Conference and Exposition, Seventh Annual Conference Proceedings, Feb. 23-27, 1992, pp. 557-568.

Noon, Jim "UC3855A/B High Performance Power Factor Preregulator", Texas Instruments, SLUA146A, May 1996, Revised Apr. 2004, 35 pages.

NXP, TEA1750, GreenChip III SMPS control IC Product Data Sheet, Apr. 6, 2007, 30 pages.

ON Semiconductor, AND8123/D, Power Factor Correction Stages Operating in Critical Conduction Mode, Sep. 2003, 20 pages.

ON Semiconductor, ND8184/D, Four Key Steps to Design a Continuous Conduction Mode PFC Stage Using the NCP1653, Nov. 2004, 8 pages.

ON Semiconductor, MC33260, GreenLine Compact Power Factor Controller: Innovative Circuit for Cost Effective Solutions, Sep. 2005, 22 pages.

ON Semiconductor, NCP1605, Enhanced, High Voltage and Efficient Standby Mode, Power Factor Controller, Feb. 2007, 23 pages.

ON Semiconductor, NCP1606, Cost Effective Power Factor Controller, Mar. 2007, 22 pages.

ON Semiconductor, NCP1654, Product Review, Power Factor Controller for Compact and Robust, Continuous Conduction Mode Pre-Converters, Mar. 2007, 10 pages.

Philips, Application Note, 90W Resonant SMPS with TEA1610 SwingChip, AN99011, 1999, 28 pages.

Prodic, A. et al, "Dead Zone Digital Controller for Improved Dynamic Response of Power Factor Preregulators," IEEE, 2003, pp. 382-388.

(56) References Cited

OTHER PUBLICATIONS

Prodic, A., Compensator Design and Stability Assessment for Fast Voltage Loops of Power Factor Correction Rectifiers, IEEE Transactions on Power Electronics, vol. 22, No. 5, Sep. 2007, pp. 1719-1730.
Prodic, A., "Digital Controller for High-Frequency Rectifiers with Power Factor Correction Suitable for On-Chip Implementation," IEEE, US, 2007, pp. 1527-1531.
Renesas, Application Note R2A20111 EVB, PFC Control IC R2A20111 Evaluation Board, Feb. 2007, 40 pages.
Renesas, HA16174P/FP, Power Factor Correction Controller IC, Jan. 6, 2006, 38 pages.
Renesas Technology Releases Industry's First Critical-Conduction-Mode Power Factor Correction Control IC Implementing Interleaved Operation, Dec. 18, 2006, 4 pages.
Seidel A. R. et al., A Practical Comparison Among High-Power-Factor Electronic Ballasts with Similar Ideas, IEEE Transactions on Industry Applications, vol. 41, No. 6, Nov.-Dec. 2005, pp. 1574-1583.
ST Microelectronics, AN993, Application Note, Electronic Ballast with PFC Using L6574 and L6561, May 2004, 20 pages.
ST Microelectronics, L6563, Advanced Transition-Mode PFC Controller, Mar. 2007, 40 pages.
ST Microelectronics, L6574, CFL/TL Ballast Driver Preheat and Dimming, Sep. 2003, 10 pages.
ST Microelectronics, Power Factor Corrector L6561, Jun. 2004, 13 pages.
ST Microelectronics, L6562, Transition-Mode PFC Controller, 2005, STMicroelectronics, Geneva, Switzerland, 16 pages.
Su, F. et al., Ultra Fast Fixed-Frequency Hysteretic Buck Converter with Maximum Charging Current Control and Adaptive Delay Compensation for DVS Applications, IEEE Journal of Solid-State Circuits, vol. 43, No. 4, Apr. 2008, pp. 815-822.
Supertex, Inc., HV9931 Unity Power Factor LED Lamp Driver, Application Note AN-H52, Mar. 7, 2007, 20 pages.
Texas Instruments, Application Report SLUA308, UCC3817 Current Sense Transformer Evaluation, Feb. 2004, 3 pages.
Texas Instruments, Application Report, SLUA309A, Avoiding Audible Noise at Light Loads when using Leading Edge Triggered PFC Converters, Sep. 2004, 4 pages.
Texas Instruments, Application Note SLUA321, Startup Current Transient of the Leading Edge Triggered PFC Controllers, Jul. 2004, 4 pages.
Texas Instruments, Application Report SLUA369B, 350-W, Two-Phase Interleaved PFC Pre-Regulator Design Review, Mar. 2007, 22 pages.
Texas Instruments, Application Report SLUS515D, Transition Mode PFC Controller, Jul. 2005, 28 pages.
Texas Instruments, Interleaving Continuous Conduction Mode PFC Controller, UCC28070, SLUS794C, Nov. 2007, revised Jun. 2009, Texas Instruments, Dallas TX, 45 pages.
Texas Instruments, SLUS828B, "8-Pin Continuous Conduction Mode (CCM) PFC Controller", UCC28019A, US, revised Apr. 2009, 48 pages.
Texas Instruments, UCC3817 BiCMOS Power Factor Preregulator Evaluation Board User's Guide, Nov. 2002, 10 pages.
Texas Instruments, Application Report SPRA902A, Average Current Mode Controlled Power Factor Correctiom Converter using TMS320LF2407A, Jul. 2005, 15 pages.
Unitrode, Design Note DN-39E, Optimizing Performance in UC3854 Power Factor Correction Applications, Nov. 1994, 6 pages.
Unitrode Products From Texas Instruments, SLUS482B, Programmable Output Power Factor Preregulator, Apr. 2001, Revised Dec. 2004, 16 pages.
Unitrode, Design Note DN-66, SLUA196A, Unitrode UC3854A/B and UC3855A/B Provide Power Limiting With Sinusoidal Input Current for PFC Front Ends, Jun. 1995, Revised Nov. 2001, 6 pages.
Unitrode Products From Texas Instruments, SLUS3951, BiCMOS Power Factor Preregulator, Feb. 2006, 25 pages.
Wong, L.K. et al., Steady State Analysis of Hysteretic Control Buck Converters, 13th International Power Electronics and Motion Control Conference (EPE-PEMC 2008), pp. 400-404.
Yao G. et al., Soft Switching Circuit for Interleaved Boost Converters, IEEE Transactions on Power Electronics, vol. 22, No. 1, Jan. 2007, pp. 80-86.
Zhang W. et al., A New Duty Cycle Control Strategy for Power Factor Correction and FPGA Implementation, IEEE Transactions on Power Electronics, vol. 21, No. 6, Nov. 2006, pp. 1745-1753.
Zhao, J. et al., Steady-State and Dynamic Analysis of a Buck Converter Using a Hysteretic PWM Control, 2004 35th Annual IEEE Power Electronics Specialists Convefference, Auchen, Germany 2004, pp. 3654-3658.
Zhou, J. et al., Novel Sampling Algorithm for DSP Controlled 2 kW PFC Converter, IEEE Transactions on Power Electronics, vol. 16, No. 2, Mar. 2001, pp. 217-222.
International Search Report and Written Opinion, International Patent Application No. PCT/US2015/026205, mailed Jul. 13, 2015, 11 pages.

\* cited by examiner

SYSTEMS AND METHODS FOR VALLEY SWITCHING IN A SWITCHING POWER CONVERTER

RELATED APPLICATIONS

The present disclosure claims priority to U.S. Provisional Patent Application Ser. No. 61/980,789, filed Apr. 17, 2014, which is incorporated by reference herein in its entirety.

FIELD OF DISCLOSURE

The present disclosure relates in general to the field of electronics, and more specifically to systems and methods for valley switching in a switching power converter.

BACKGROUND

Many electronic systems include circuits, such as switching power converters or transformers that interface with a dimmer. The interfacing circuits deliver power to a load in accordance with the dimming level set by the dimmer. For example, in a lighting system, dimmers provide an input signal to the lighting system. The input signal represents a dimming level that causes the lighting system to adjust power delivered to a lamp, and, thus, depending on the dimming level, increase or decrease the brightness of the lamp. Many different types of dimmers exist. In general, dimmers generate an output signal in which a portion of an alternating current ("AC") input signal is removed or zeroed out. For example, some analog-based dimmers utilize a triode for alternating current ("triac") device to modulate a phase angle of each cycle of an alternating current supply voltage. This modulation of the phase angle of the supply voltage is also commonly referred to as "phase cutting" the supply voltage. Phase cutting the supply voltage reduces the average power supplied to a load, such as a lighting system, and thereby controls the energy provided to the load.

A particular type of a triac-based, phase-cutting dimmer is known as a leading-edge dimmer. A leading-edge dimmer phase cuts from the beginning of an AC cycle, such that during the phase-cut angle, the dimmer is "off" and supplies no output voltage to its load, and then turns "on" after the phase-cut angle and passes phase cut input signal to its load. To ensure proper operation, the load must provide to the leading-edge dimmer a load current sufficient to maintain an inrush current above a current necessary for opening the triac. Due to the sudden increase in voltage provided by the dimmer and the presence of capacitors in the dimmer, the current that must be provided is typically substantially higher than the steady state current necessary for triac conduction. Additionally, in steady state operation, the load must provide to the dimmer a load current to remain above another threshold known as a "hold current" needed to prevent premature disconnection of the triac.

Figure 1:
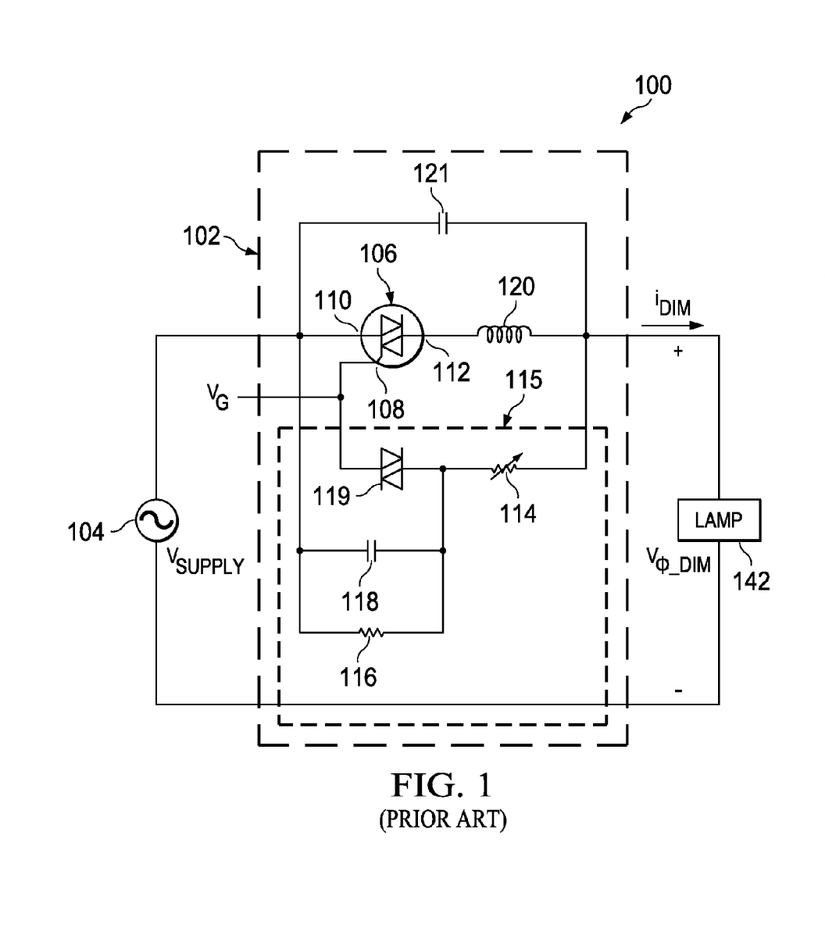
FIG. 1 illustrates a lighting system that includes a triac-based leading-edge dimmer, as is known in the art.
Figure 2:
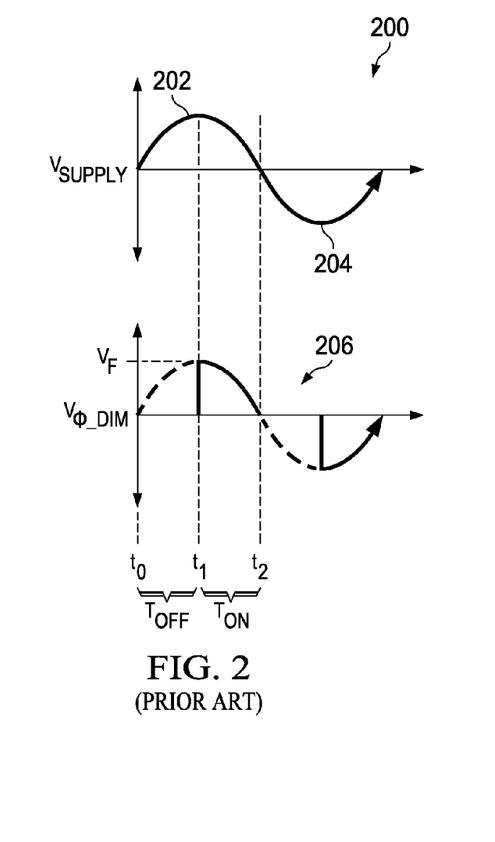
FIG. 2 illustrates example voltage and current graphs associated with the lighting system depicted in FIG. 1, as is known in the art.

FIG. 1 depicts a lighting system 100 that includes a triac-based leading-edge dimmer 102 and a lamp 142. FIG. 2 depicts example voltage and current graphs associated with lighting system 100. Referring to FIGS. 1 and 2, lighting system 100 receives an AC supply voltage $V_{SUPPLY}$ from voltage supply 104. The supply voltage $V_{SUPPLY}$ indicated by voltage waveform 200 may be, for example, a nominally 60 Hz/110 V line voltage in the United States of America or a nominally 50 Hz/220 V line voltage in Europe. Triac 106 acts as a voltage-driven switch, and a gate terminal 108 of triac 106 controls current flow between the first terminal 110 and the second terminal 112. A gate voltage $V_G$ on the gate terminal 108 above a firing threshold voltage value $V_F$ will cause triac 106 to turn ON, in turn causing a short of capacitor 121 and allowing current to flow through triac 106 and dimmer 102 to generate an output current $i_{DIM}$.

Assuming a resistive load for lamp 142, the dimmer output voltage $V_{\Phi\_DIM}$, indicated by voltage waveform 206, may be zero volts from the beginning of each of half cycles 202 and 204 at respective times $t_0$ and $t_2$ until the gate voltage $V_G$ reaches the firing threshold voltage value $V_F$. Dimmer output voltage $V_{\Phi\_DIM}$ represents the output voltage of dimmer 102. During time period $T_{OFF}$, the dimmer 102 chops or cuts the supply voltage $V_{SUPPLY}$ so that the dimmer output voltage $V_{\Phi\_DIM}$ remains at zero volts during time period $t_{OFF}$. At time $t_1$, the gate voltage $V_G$ reaches the firing threshold value $V_F$, and triac 106 begins conducting. Once triac 106 turns ON, the dimmer voltage $V_{\Phi\_DIM}$ tracks the supply voltage $V_{SUPPLY}$ during time period $t_{ON}$.

Once triac 106 turns ON, the current $i_{DIM}$ drawn from triac 106 must exceed an attach current $i_{ATT}$ in order to sustain the inrush current through triac 106 above a threshold current necessary for opening triac 106. In addition, once triac 106 turns ON, triac 106 continues to conduct current $i_{DIM}$ regardless of the value of the gate voltage $V_G$ as long as the current $i_{DIM}$ remains above a holding current value $i_{HC}$. The attach current value $i_{ATT}$ and the holding current value $i_{HC}$ are a function of the physical characteristics of triac 106. Once the current $i_{DIM}$ drops below the holding current value $i_{HC}$, i.e. $i_{DIM} < i_{HC}$, triac 106 turns OFF (i.e., stops conducting), until the gate voltage $V_G$ again reaches the firing threshold value $V_F$. In many traditional applications, the holding current value $i_{HC}$ is generally low enough so that, ideally, the current $i_{DIM}$ drops below the holding current value $i_{HC}$ when the supply voltage $V_{SUPPLY}$ is approximately zero volts near the end of the half cycle 202 at time $t_2$.

The variable resistor 114 in series with the parallel connected resistor 116 and capacitor 118 form a timing circuit 115 to control the time $t_1$ at which the gate voltage $V_G$ reaches the firing threshold value $V_F$. Increasing the resistance of variable resistor 114 increases the time $T_{OFF}$, and decreasing the resistance of variable resistor 114 decreases the time $T_{OFF}$. The resistance value of the variable resistor 114 effectively sets a dimming value for lamp 142. Diac 119 provides current flow into the gate terminal 108 of triac 106. The dimmer 102 also includes an inductor choke 120 to smooth the dimmer output voltage $V_{\Phi\_DIM}$. Triac-based dimmer 102 also includes a capacitor 121 connected across triac 106 and inductor choke 120 to reduce electro-magnetic interference.

Ideally, modulating the phase angle of the dimmer output voltage $V_{\Phi\_DIM}$ effectively turns the lamp 142 OFF during time period $T_{OFF}$ and ON during time period $T_{ON}$ for each half cycle of the supply voltage $V_{SUPPLY}$. Thus, ideally, the dimmer 102 effectively controls the average energy supplied to lamp 142 in accordance with the dimmer output voltage $V_{\Phi\_DIM}$.

Another particular type of phase-cutting dimmer is known as a trailing-edge dimmer. A trailing-edge dimmer phase cuts from the end of an AC cycle, such that during the phase-cut angle, the dimmer is "off" and supplies no output voltage to its load, but is "on" before the phase-cut angle and in an ideal case passes a waveform proportional to its input voltage to its load.

Figure 3:
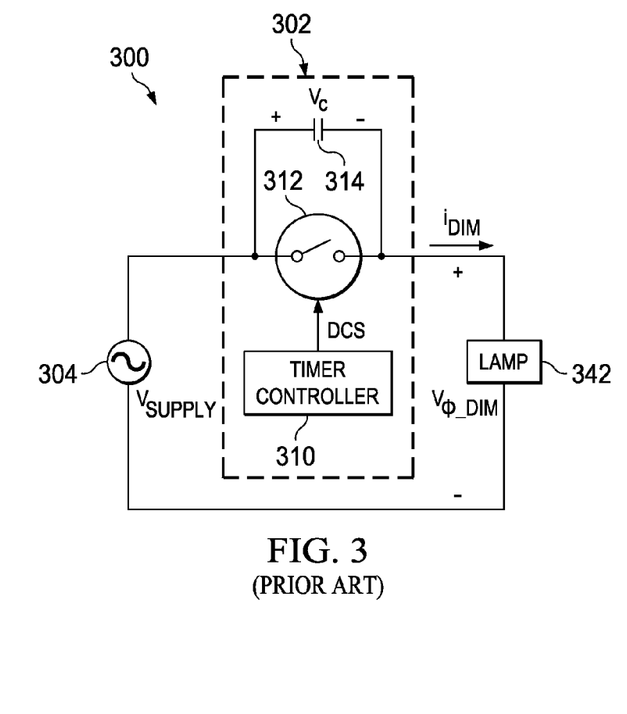
FIG. 3 illustrates a lighting system that includes a phase-cut trailing-edge dimmer, as is known in the art.
Figure 4:
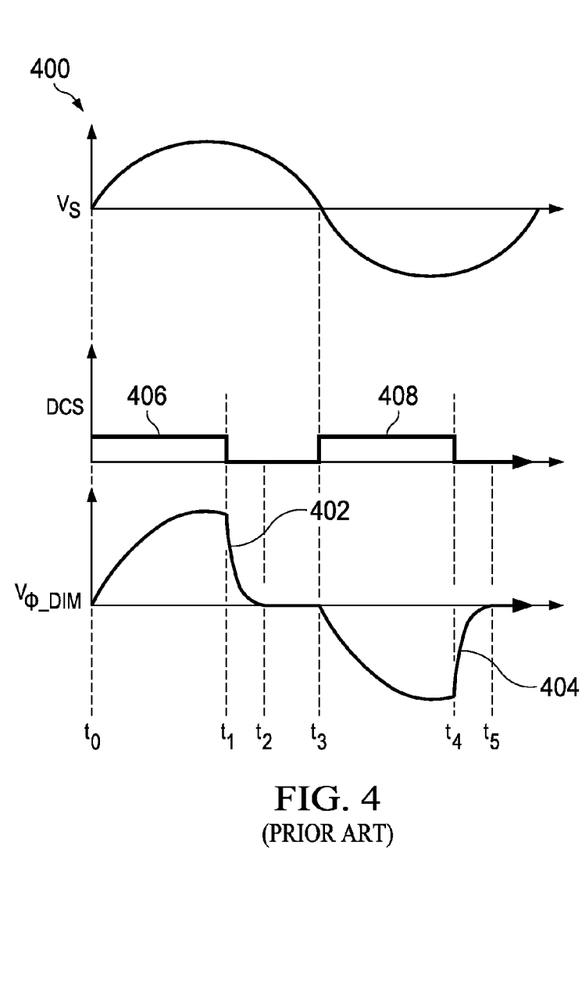
FIG. 4 illustrates example voltage and current graphs associated with the lighting system depicted in FIG. 3, as is known in the art.

FIG. 3 depicts a lighting system 300 that includes a trailing-edge, phase-cut dimmer 302 and a lamp 342. FIG. 4 depicts example voltage and current graphs associated with lighting system 300. Referring to FIGS. 3 and 4, lighting system 300 receives an AC supply voltage $V_{SUPPLY}$ from voltage supply 304. The supply voltage $V_{SUPPLY}$, indicated by voltage waveform 400, is, for example, a nominally 60 Hz/110 V line voltage in the United States of America or a nominally 50 Hz/220 V line voltage in Europe. Trailing-edge dimmer 302 phase cuts trailing edges, such as trailing edges 402 and 404, of each half cycle of supply voltage $V_{SUPPLY}$. Since each half cycle of supply voltage $V_{SUPPLY}$ is 180 degrees of the supply voltage $V_{SUPPLY}$, the trailing-edge dimmer 302 phase cuts the supply voltage $V_{SUPPLY}$ at an angle greater than 0 degrees and less than 180 degrees. The phase cut, input voltage $V_{\Phi\_DIM}$ to lamp 342 represents a dimming level that causes the lighting system 300 to adjust power delivered to lamp 342, and, thus, depending on the dimming level, increase or decrease the brightness of lamp 342.

Dimmer 302 includes a timer controller 310 that generates dimmer control signal DCS to control a duty cycle of switch 312. The duty cycle of switch 312 is a pulse width (e.g., times $t_1$-$t_0$) divided by a period of the dimmer control signal (e.g., times $t_3$-$t_0$) for each cycle of the dimmer control signal DCS. Timer controller 310 converts a desired dimming level into the duty cycle for switch 312. The duty cycle of the dimmer control signal DCS is decreased for lower dimming levels (i.e., higher brightness for lamp 342) and increased for higher dimming levels. During a pulse (e.g., pulse 406 and pulse 408) of the dimmer control signal DCS, switch 312 conducts (i.e., is "on"), and dimmer 302 enters a low resistance state. In the low resistance state of dimmer 302, the resistance of switch 312 is, for example, less than or equal to 10 ohms. During the low resistance state of switch 312, the phase cut, input voltage $V_{\Phi\_DIM}$ tracks the input supply voltage $V_{SUPPLY}$ and dimmer 302 transfers a dimmer current $i_{DIM}$ to lamp 342.

When timer controller 310 causes the pulse 406 of dimmer control signal DCS to end, dimmer control signal DCS turns switch 312 off, which causes dimmer 302 to enter a high resistance state (i.e., turns off). In the high resistance state of dimmer 302, the resistance of switch 312 is, for example, greater than 1 kiloohm. Dimmer 302 includes a capacitor 314, which charges to the supply voltage $V_{SUPPLY}$ during each pulse of the dimmer control signal DCS. In both the high and low resistance states of dimmer 302, the capacitor 314 remains connected across switch 312. When switch 312 is off and dimmer 302 enters the high resistance state, the voltage $V_C$ across capacitor 314 increases (e.g., between times $t_1$ and $t_2$ and between times $t_4$ and $t_5$). The rate of increase is a function of the amount of capacitance C of capacitor 314 and the input impedance of lamp 342. If effective input resistance of lamp 342 is low enough, it permits a high enough value of the dimmer current $i_{DIM}$ to allow the phase cut, input voltage $V_{\Phi\_DIM}$ to decay to a zero crossing (e.g., at times $t_2$ and $t_5$) before the next pulse of the dimmer control signal DCS.

Figure 5:
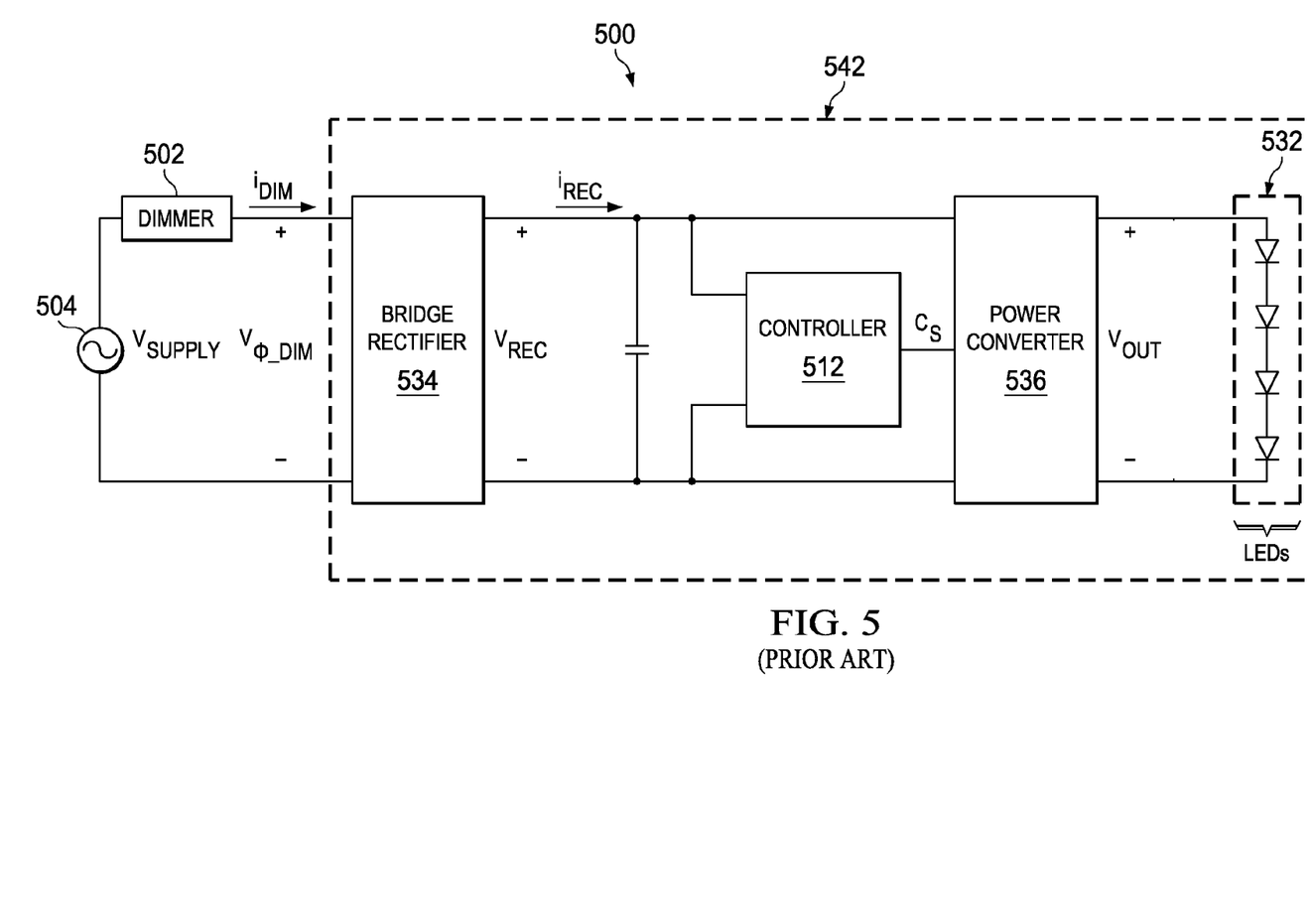
FIG. 5 illustrates an example lighting system including a power converter, as is known in the art.

In some lighting applications, a dimmer may not be directly coupled to a lamp. For example, in applications in which a lamp comprises a low-power lamp (e.g., halogen or light-emitting diode (LED) lamp), a switching power converter may be interfaced between the dimmer and the lamp to convert the AC input voltage to a direct current (DC) voltage to be delivered to the lamp. FIG. 5 depicts a lighting system 500 that includes a lamp assembly 542 with a bridge rectifier 534 and a power converter 536 for converting an AC voltage input to a DC voltage for delivery to a low-power lamp comprising LEDs 532, as is known in the art. As shown in FIG. 5, lighting system 500 may include a voltage supply 504, a dimmer 502, and a lamp assembly 542. Voltage supply 504 may generate a supply voltage $V_{SUPPLY}$ that is, for example, a nominally 60 Hz/110 V line voltage in the United States of America or a nominally 50 Hz/220 V line voltage in Europe.

Dimmer 502 may comprise any system, device, or apparatus for generating a dimming signal to other elements of lighting system 500, the dimming signal representing a dimming level that causes lighting system 500 to adjust power delivered to a lamp, and, thus, depending on the dimming level, increase or decrease the brightness of LEDs 532. Thus, dimmer 502 may include a leading-edge dimmer similar to that depicted in FIG. 1, a trailing-edge dimmer similar to that depicted in FIG. 3, or any other suitable dimmer.

Lamp assembly 542 may comprise any system, device, or apparatus for converting electrical energy (e.g., delivered by dimmer 502) into photonic energy (e.g., at LEDs 532). For example, lamp assembly 542 may comprise a multifaceted reflector form factor (e.g., an MR16 form factor) with a lamp comprising LEDs 532. As shown in FIG. 5, lamp assembly 542 may include a bridge rectifier 534, a power converter 536, and a switch state controller 512.

Bridge rectifier 534 may comprise any suitable electrical or electronic device as is known in the art for converting the whole of alternating current voltage signal $V_{\Phi\_DIM}$ into a rectified voltage signal $v_{REC}$ having only one polarity.

Power converter 536 may comprise any system, device, or apparatus configured to convert an input voltage (e.g., $v_{REC}$) to a different output voltage (e.g., $v_{OUT}$) wherein the conversion is based on a control signal (e.g., a pulse-width modulated control signal communicated from switch state controller 512). Accordingly, power converter 536 may comprise a boost converter, a buck converter, a boost-buck converter, or other suitable power converter.

LEDs 532 may comprise one or more light-emitting diodes configured to emit photonic energy in an amount based on the voltage $v_{OUT}$ across the LEDs 532.

Switch-state controller 512 may comprise any system, device, or apparatus configured to determine one or more characteristics of voltage $v_{REC}$ present at the input of power converter 536 and control an amount of current $i_{REC}$ drawn by power converter 536 based on such one or more characteristics of voltage $v_{REC}$.

Figure 6:
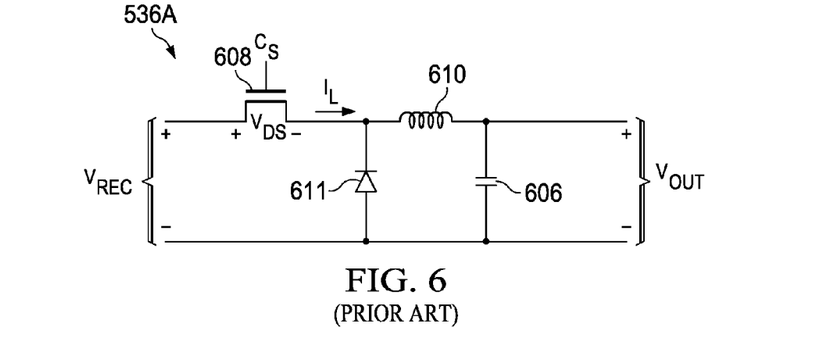
FIG. 6 illustrates an example switching power for use in the lighting system of FIG. 5, as is known in the art.

In some embodiments, power converter 536 may comprise a switching power converter, such as a buck converter 536A, as shown in FIG. 6. As shown in FIG. 6, a buck-type power converter 536A may comprise a switch 608 that may operate in response to a control signal $C_S$ to regulate the transfer of energy from the rectified, time-varying input voltage $V_{REC}$, through inductor 610 to capacitor 606. Power converter 536A may also include a diode 611 that prevents reverse current flow from capacitor 606 into inductor 610. Energy transferred through inductor 610 may be stored by capacitor 606. Capacitor 606 may have sufficient capacitance to maintain an approximately constant voltage $V_{OUT}$ (e.g., lesser than the peak of input voltage $V_{REC}$) while providing current to LEDs 532.

In operation, inductor current $i_L$ may vary over time, with a peak input current proportionate to the "on-time" of switch 608 and with the energy transferred to capacitor 606 proportionate to the "on-time" squared. As shown in FIG. 6, in some implementations switch 608 may comprise n-channel field effect transistor (FET), and control signal $C_S$ is a pulse-width modulated (PWM) control signal that causes switch 608 to conduct when control signal $C_S$ is high. Thus, in such implementations, the "on-time" of switch 608 may be determined by the pulse width of control signal $C_S$, and the energy transferred from $V_{REC}$ to capacitor 606 may be proportionate to a square of the pulse width of control signal $C_S$.

Control signal $C_S$ may be generated by switch state controller 512, with a goal of causing switching power converter 536A to transfer a desired amount of energy to capacitor 606, and thus, to LEDs 532. The desired amount of energy may depend upon the voltage and current requirements of LEDs 532. To provide power factor correction close to one, switch state controller 512 may generally seek to control input current $i_{REC}$ so that input current $i_{REC}$ tracks input voltage $V_{REC}$ while holding capacitor voltage $V_{OUT}$ constant. Accordingly, input current $i_{REC}$ and peak inductor current $i_L$ may each be proportional to the conduction period of dimmer 502 (e.g., the period of time in which dimmer 502 is on and conducts current).

In implementations in which switch 608 is implemented with a FET, one known problem is that the inherent capacitance of the FET undesirably resonates with inductor 610 after input current in inductor 610 is demagnetized. A known technique to minimize such resonance and to reduce the attendant switching losses is sometimes referred to as "valley switching" in which control signal $C_S$ is controlled to turn on switch 608 when the drain-to-source voltage $V_{DS}$ of switch 608 reaches its minimum value.

Figure 7:
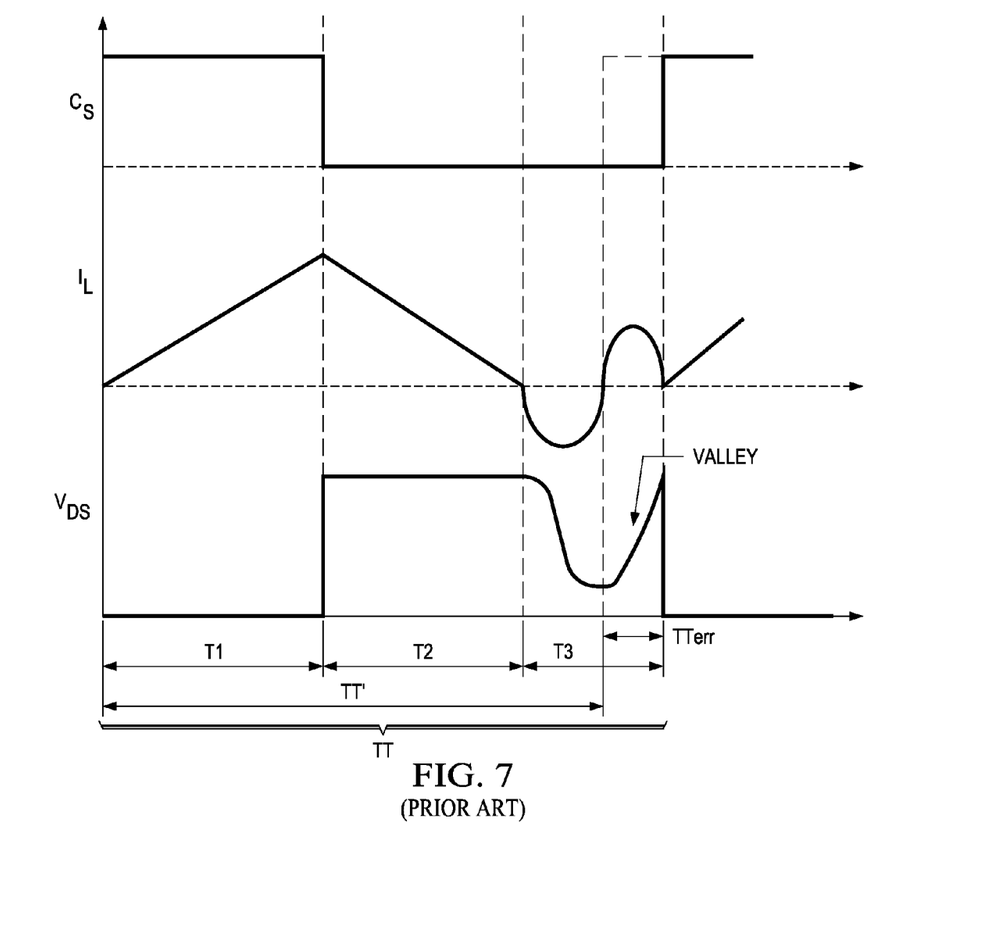
FIG. 7 illustrates example voltage and current graphs associated with the switching power converter depicted in FIG. 6, as is known in the art.

Referring now to FIG. 7, there is depicted a timing diagram illustrating the concept of valley switching, as is known in the art. In the absence of valley switching, switch state controller 512 may operate so as to maintain a target switching period TT for a particular dimmer control setting. The period TT may be equal to the sum of interval T1, T2, and T3, wherein T1 is an interval of time in which switch 608 is activated and conducts current, T2 is an interval of the time in which switch 608 is deactivated and current $i_L$ flows while inductor 610 is demagnetized, and T3 is an interval of time, which may be referred to as a valley interval, in which no current $i_L$ flows. However, when implementing valley switching, a valley of drain-to-source voltage $V_{DS}$ may occur before or after the end of target switching period TT. Accordingly, to implement valley switching, switch state controller 512 may assert control signal $C_S$ to activate switch 608 before or after the end of target switching period TT, thus modifying the desired switching period by an error $TT_{err}$, thus reducing or extending the switching period to obtain an actual switching period TT'. Accordingly, conventional valley-switching techniques lead to reduction or addition in the average current supplied to LEDs 532 from an intended amount. Thus, maintaining constant voltage regulation for a load (e.g., LEDs 532) while performing valley switching is a challenge if switching periods may become quantized to specific valleys. Another challenge is to maintain valley switching throughout an entire phase angle range of a dimmer while maintaining desired output regulation.

SUMMARY

In accordance with the teachings of the present disclosure, certain disadvantages and problems associated with power efficiency in valley switching of switching power converters may be reduced or eliminated.

In accordance with embodiments of the present disclosure, an apparatus may include a switching power converter and a controller. The switching power converter may be configured to transfer energy from an input of the power converter to a load coupled to the power converter in conformity with a regulated current, the switching power converter comprising a switch and an energy storage device, wherein the regulated current is a function of a switching period of the switching power converter and a peak current of the energy storage device during the switching period. The controller may be configured to generate a control signal to activate and deactivate the switch in order to control the switching period and the peak current to maintain the regulated current at a desired current level such that: if the switching period decreases below a minimum switching period, the controller increases the switching period by a ringing period of a voltage of the switch and increases the peak current to compensate for the increase of the switching period in order to maintain the regulated current, and if the peak current increases above a maximum peak current, the controller decreases the switching period by a ringing period of the voltage of the switch and decreases the peak current to compensate for the decrease of the switching period in order to maintain the regulated current.

In accordance with these and other embodiments of the present disclosure, a method may include comprising activating and deactivating a switch of a switching power converter in order to control a switching period and peak current of the switching power converter in order to maintain a regulated current of the switching power converter at a desired current level such that: if the switching period decreases below a minimum switching period, increasing the switching period by a ringing period of a voltage of the switch and increasing the peak current to compensate for the increase of the switching period in order to maintain the regulated current, and if the peak current increases above a maximum peak current, decreasing the switching period by a ringing period of the voltage of the switch and decreasing the peak current to compensate for the decrease of the switching period in order to maintain the regulated current.

Technical advantages of the present disclosure may be readily apparent to one of ordinary skill in the art from the figures, description and claims included herein. The objects and advantages of the embodiments will be realized and achieved at least by the elements, features, and combinations particularly pointed out in the claims.

It is to be understood that both the foregoing general description and the following detailed description are examples and explanatory and are not restrictive of the claims set forth in this disclosure.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein.

DETAILED DESCRIPTION

Figure 8:
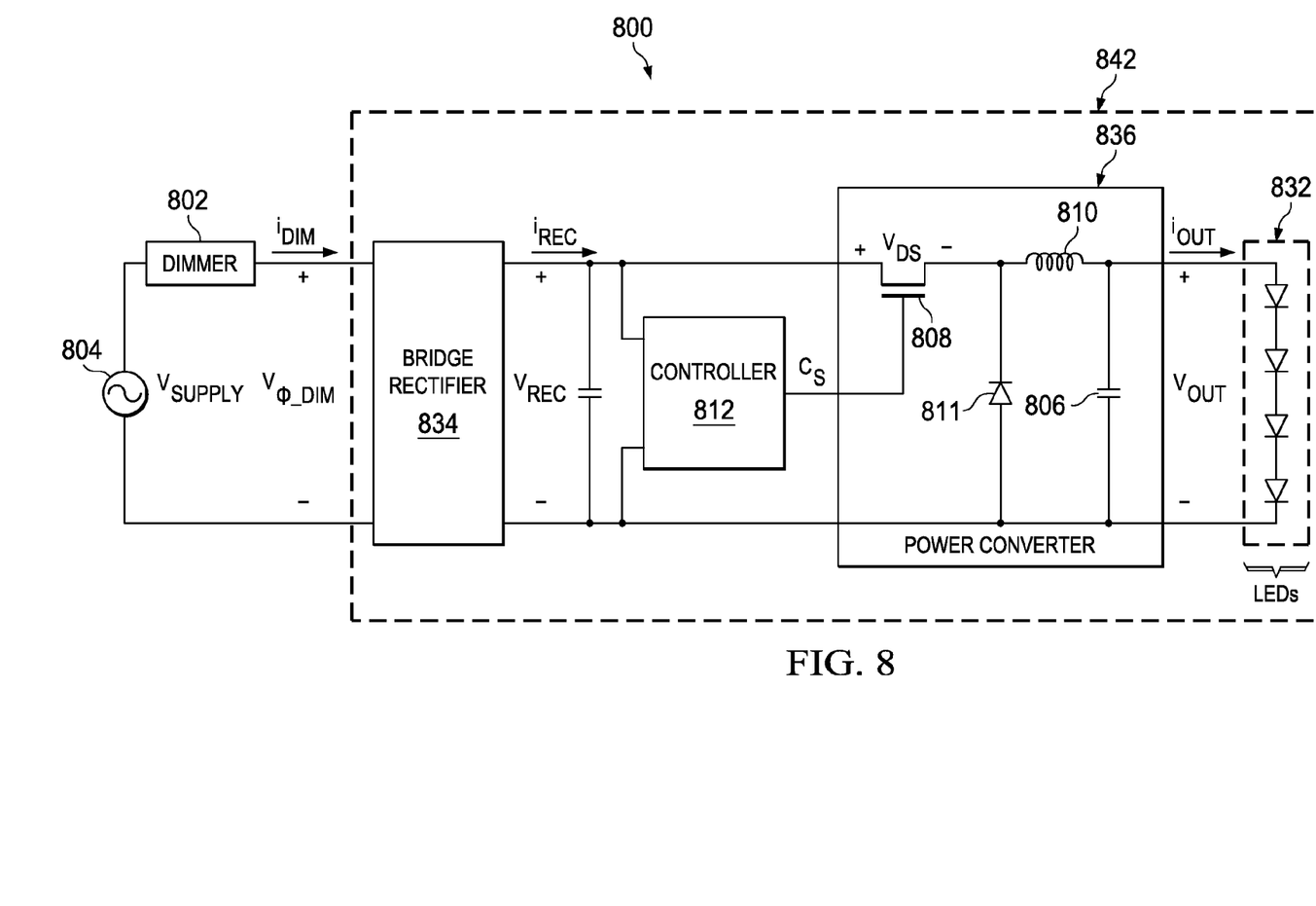
FIG. 8 illustrates an example lighting system including a power converter, in accordance with embodiments of the present disclosure.

FIG. 8 depicts a lighting system 800 with improved valley switching techniques, in accordance with embodiments of the present disclosure. As shown in FIG. 8, lighting system 800 may include a voltage supply 804, a dimmer 802, and a lamp assembly 842. Voltage supply 804 may generate a supply voltage $V_{SUPPLY}$ that is, for example, a nominally 60 Hz/110 V line voltage in the United States of America or a nominally 50 Hz/220 V line voltage in Europe.

Dimmer 802 may comprise any system, device, or apparatus for generating a dimming signal to other elements of lighting system 800, the dimming signal representing a dimming level that causes lighting system 800 to adjust power delivered to a lamp, and, thus, depending on the dimming level, increase or decrease the brightness of LEDs 832. Thus, dimmer 802 may include a leading-edge dimmer similar to that depicted in FIG. 1, a trailing-edge dimmer similar to that depicted in FIG. 3, or any other suitable dimmer.

Lamp assembly 842 may comprise any system, device, or apparatus for converting electrical energy (e.g., delivered by dimmer 802) into photonic energy (e.g., at LEDs 832). For example, lamp assembly 842 may comprise a multifaceted reflector form factor (e.g., an MR16 form factor) with a lamp comprising LEDs 832. As shown in FIG. 8, lamp assembly 842 may include a bridge rectifier 834, a power converter 836, and a switch state controller 812.

Bridge rectifier 834 may comprise any suitable electrical or electronic device as is known in the art for converting the whole of alternating current voltage signal $V_{\Phi\_DIM}$ into a rectified voltage signal $v_{REC}$ having only one polarity.

Power converter 836 may comprise any system, device, or apparatus configured to convert an input voltage (e.g., $v_{REC}$) to a different output voltage (e.g., $v_{OUT}$) wherein the conversion is based on a control signal (e.g., a pulse-width modulated control signal communicated from switch state controller 812). Although power converter 836 is depicted in FIG. 8 as a buck converter, power converter 836 may comprise a boost converter, a buck converter, a boost-buck converter, or other suitable power converter. In a buck-type implementation, as shown in FIG. 8, power converter 836 may comprise a switch 808 (e.g., an n-type field effect transistor) that may operate in response to a control signal $C_S$ (e.g., a pulse-width modulated control signal) received from switch state controller 812 to regulate the transfer of energy from the rectified, time-varying input voltage $V_{REC}$, through inductor 810 to capacitor 806. Power converter 836 may also include a diode 811 that prevents reverse current flow from capacitor 806 into inductor 810. Energy transferred through inductor 810 may be stored by capacitor 806. Capacitor 806 may have sufficient capacitance to maintain an approximately constant voltage $V_{OUT}$ (e.g., lesser than the peak of input voltage $V_{REC}$) while providing current to LEDs 832.

LEDs 832 may comprise one or more light-emitting diodes configured to emit photonic energy in an amount based on the voltage $v_{OUT}$ across the LEDs 832.

Switch-state controller 812 may comprise any system, device, or apparatus configured to determine one or more characteristics of voltage $v_{REC}$ present at the input of power converter 836 and control an amount of current $i_{REC}$ drawn by power converter 836 based on such one or more characteristics of voltage $v_{REC}$. Functionality of switch-state controller 812 is set forth in more detail below.

In operation, switch state controller 812 may generate control signal $C_S$, with a goal of causing switching power converter 836 to transfer a desired amount of energy to capacitor 806, and thus, to LEDs 832. Accordingly, inductor current $i_L$ may vary over time, with a peak input current proportionate to the "on-time" of switch 808 and with the energy transferred to capacitor 806 proportionate to the "on-time" squared. The desired amount of energy may depend upon the voltage and current requirements of LEDs 832. To provide power factor correction close to one, switch state controller 812 may generally seek to control input current $i_{REC}$ so that input current $i_{REC}$ tracks input voltage $V_{REC}$ while holding capacitor voltage $V_{OUT}$ constant. Thus, input current $i_{REC}$ and peak inductor current $i_L$ may each be proportional to the conduction period of dimmer 802 (e.g., the period of time in which dimmer 802 is on and conducts current).

The regulated LED current is an average of the inductor current feeding directly to the load. For a buck converter, such LED current $i_{OUT}$ is given by:

$$I_{out}=dim*I_{fullscale}=0.5*I_{pk}*(TT_{crit}/TT')$$

where dim is a dimmer phase angle normalized to 1 (e.g., has a value between 0 and 1), $I_{fullscale}$ is a full-scale output current for LEDs 832, $I_{pk}$ is the peak value of inductor current $i_L$, $TT_{crit}$ is the critical conduction switching period (e.g., intervals T1 and T2 in FIG. 7) and TT' is the overall actual switching period (e.g., intervals T1, T2, and T3 in FIG. 7).

To regulate output current for a given phase angle of dimmer 802, controller 812 may scale the peak inductor current $I_{pk}$ and actual switching period TT'. The peak inductor current may thus be given as:

$$I_{pk}=(I_{fullscale}/Dim_{fullscale})*dim+i_{pk\text{-}offset}$$

where $Dim_{fullscale}$ is the fullscale value of dim (which, in some cases may be 1) and $i_{pk\text{-}offset}$ is a current error term that takes into account the difference between a desired average current $I_{out}$ during a target switching period TT and an actual current of $I_{out}$ during an actual switching period TT', to offset effects of actual switching periods TT' that are quantized to valleys in order to provide accurate load regulation.

Thus, controller 812 may cause peak inductor current $I_{pk}$ to scale linearly with the dimmer phase angle dim, which also may also cause critical conduction period $TT_{crit}$ to also vary linearly with dimmer phase angle dim. As a result, actual switching period TT' may also scale linearly with dimmer phase angle dim for a fixed valley interval T3. Accordingly, an actual switching period TT' can be quantized to a fixed valley interval T3 while scaling peak inductor current $I_{pk}$ to achieve load regulation.

Figure 9:
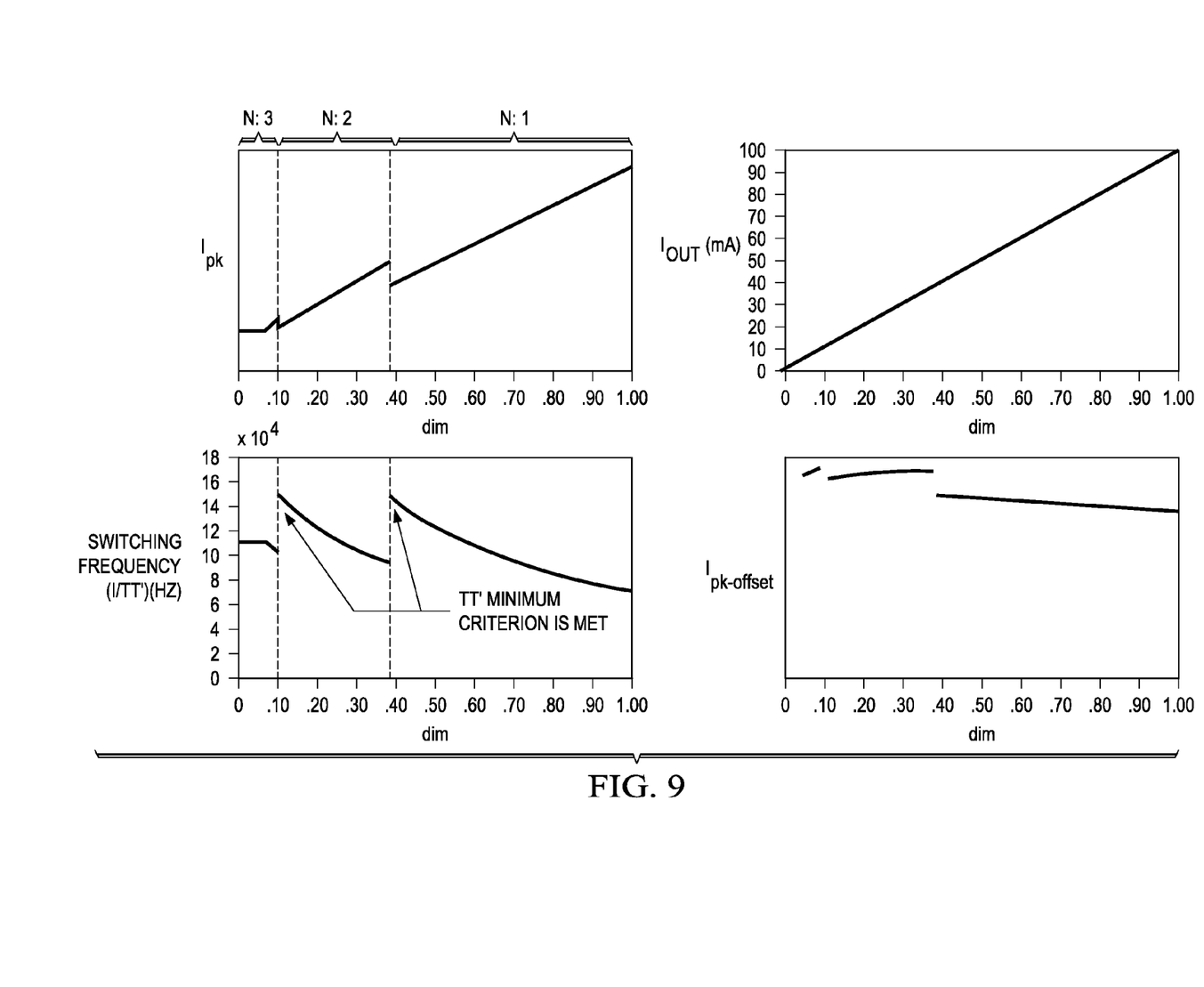
FIG. 9 illustrates example graphs plotting profiles of peak inductor current, switching frequency, load current, and offset current versus dimmer phase angle for a decreasing dimmer phase angle, in accordance with embodiments of the present disclosure.

For example, in the case of decreases of dimmer phase angle dim, controller 812 may cause peak current $I_{pk}$ to scale down linearly with dimmer phase angle dim. As actual switching period TT' scales down linearly with dim for a fixed valley interval T3, it is possible for actual switching period TT' to decrease to a minimum switching period $TT_{min}$ (or a maximum switching frequency value) which may be a criterion for increasing the existing number of valleys by one. In doing so, actual switching period TT' may increase by one inductor-parasitic capacitor (LC) ringing period of the drain-source voltage $V_{DS}$ and may in turn cause a decrease in load current $i_{OUT}$. Controller 812 may compensate for this transient effect by increasing peak inductor current $I_{pk}$ in order to maintain constant output current regulation. The same linear peak current profile as a function of dimmer phase angle dim may be carried out with the new peak inductor current $I_{pk}$ until the minimum switching period is again met which may prompt controller 812 to seek the next valley. FIG. 9 illustrates example graphs plotting profiles of peak inductor current $I_{pk}$, switching frequency (e.g., 1/TT'), load current $i_{OUT}$, and current error $i_{pk\text{-}offset}$ versus dimmer phase angle dim. In FIG. 9, N represents an LC ringing valley at which valley switching occurs (e.g., at which an actual switching period TT' ends and a new one begins).

Figure 10:
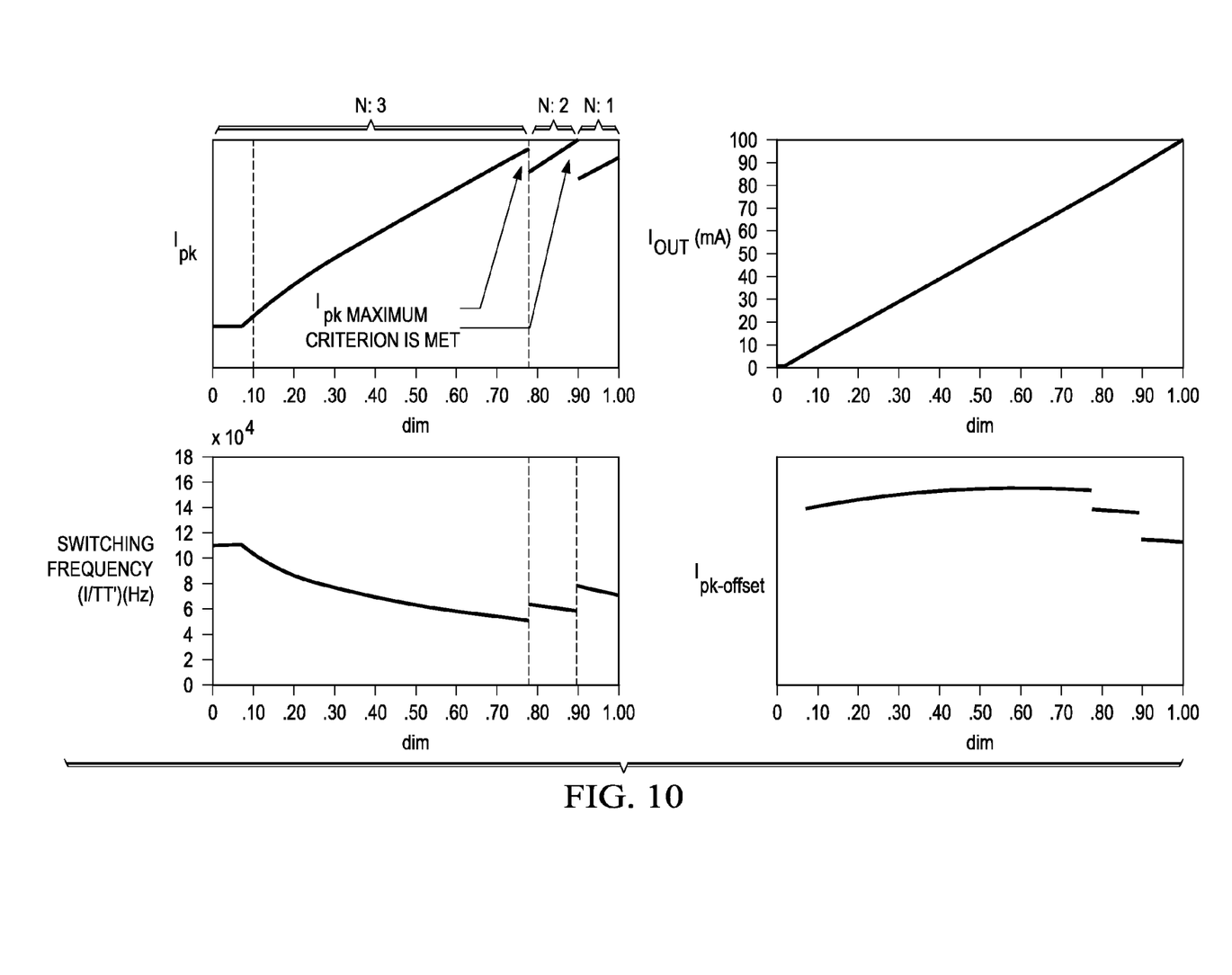
FIG. 10 illustrates example graphs plotting profiles of peak inductor current, switching frequency, load current, and offset current versus dimmer phase angle for an increasing dimmer phase angle, in accordance with embodiments of the present disclosure.

As another example, in the case of increases of dimmer phase angle dim, controller 812 may cause peak current $I_{pk}$ to scale up linearly with dimmer phase angle dim, such that switching period TT' scales up linearly with dim for a fixed valley interval T3. In doing so, it is possible for peak current $I_{pk}$ to increase to a maximum inductor peak current limit which becomes the criterion for decreasing the number of valleys by one. Thus, upon reaching the criterion, actual switching period TT' may decrease by one LC ringing period of the drain-source voltage $V_{DS}$ and may in turn cause an increase in load current $i_{OUT}$. Controller 812 may compensate for this transient effect by decreasing peak inductor current $I_{pk}$ in order to maintain constant output current regulation. The same linear peak current profile as a function of dimmer phase angle dim may be carried out with the new peak inductor current $I_{pk}$ until the maximum inductor peak current limit is again met which may prompt controller 812 to seek the next valley. FIG. 10 illustrates example graphs plotting profiles of peak inductor current $I_{pk}$, switching frequency (e.g., 1/TT'), load current $i_{OUT}$, and current error $i_{pk\text{-}offset}$ versus dimmer phase angle dim. In FIG. 10, N represents an LC ringing valley at which valley switching occurs (e.g., at which an actual switching period TT' ends and a new one begins).

Figure 11:
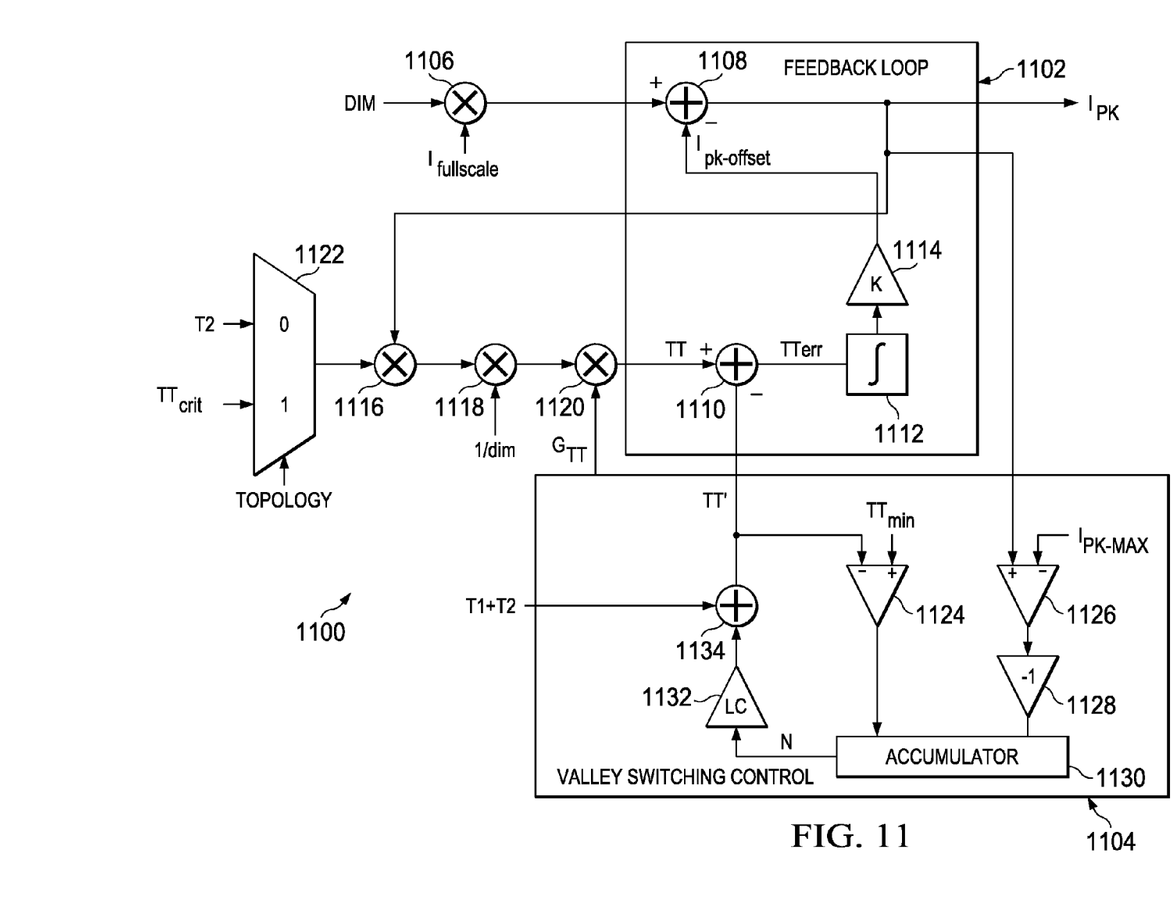
FIG. 11 illustrates a block diagram of an algorithm for regulating a load current in the lighting system of FIG. 8, in accordance with embodiments of the present disclosure.

FIG. 11 illustrates a block diagram of a method 1100 for regulating a load current in the lighting system of FIG. 8, in accordance with embodiments of the present disclosure. Method 1100 may be implemented by controller 812. As shown in FIG. 11, controller 812 may implement a feedback loop 1102 for regulating load current $i_{OUT}$, and a valley switching block 1104 for determining which LC ringing valley to switch. Feedback loop 1102 may regulate load current $i_{OUT}$ by regulating peak inductor current $I_{pk}$ based on dimmer phase angle dim and full-scale output current $I_{fullscale}$, which may be multiplied together by multiplier 1106 to generate a target peak inductor current, and current error $I_{pk\text{-}offset}$, which may be subtracted from the target peak inductor current by combiner 1108. Current error $I_{pk\text{-}offset}$ may be calculated by integrating with integrator 1112 the switching period error $TT_{err}$ generated by combiner 1110 which is equal to the difference of actual switching period TT' (determined by valley switching control block 1104) and target switching period TT, and multiplying the integrated switching period error by a gain block 1114 having gain K, which effectively translates the integrated switching period error into a corresponding current error $I_{pk\text{-}offset}$.

Controller 812 may determine target switching period TT based on dimmer phase angle dim and peak inductor current $I_{pk}$. For example, based on a topology of switching power converter 836, a multiplexer 1122 may output one of the interval T2 or the interval of critical conduction period $TT_{crit}$. For example, if the topology of switching power converter 836 is a buck converter, as shown in FIG. 8, multiplexer 1122 may output the interval of critical conduction period $TT_{crit}$. On the other hand, if switching power converter 836 employs a flyback topology, multiplexer 1122 may output the interval T2. The value output by multiplexer 1122 may be multiplied by peak inductor current $I_{pk}$ at multiplier 1116 and inverse of the dimmer phase angle dim at multiplier 1118, generating an intermediate result. The value of this intermediate result may then be multiplied at block 1120 by a constant $G_{TT}$ to generate target switching period TT. The constant $G_{TT}$ is a constant that may provide a user or a circuit designer programmability in choosing valley interval T3. For example, for a buck topology, $G_{TT}$ may equal TT/(T1+T2).

In valley switching control block 1104, a comparator 1124 may compare actual switching period TT' to a minimum switching period $TT_{min}$ and generate a signal indicative of the comparison. Likewise, a comparator 1126 may compare peak inductor current $I_{pk}$ to a maximum peak inductor current $I_{pk\text{-}max}$ and generate a signal indicative of the comparison. The signal generated by comparator 1126 may be multiplied by -1 by a gain block 1128. Accordingly, an accumulator 1130 may increment by 1 if actual switching period TT' is less than minimum switching period $TT_{min}$, and may decrement by 1 if peak inductor current $I_{pk}$ exceeds maximum peak inductor current $I_{pk\text{-}max}$ in order to determine the ringing valley N at which switching shall occur. The value N may be multiplied by the LC ringing period of drain-source voltage $V_{DS}$ by gain block 1132, the result being added by combiner 1134 to the intervals T1 and T2 to generate actual switching period TT'. Controller 812 may then generate an appropriate control signal $C_s$ in order to cause switching power converter 836 to operate at the actual switching period TT' calculated by valley switching control block 1104 with a peak inductor current $I_{pk}$ calculated by feedback loop 1102.

Thus, at the time of transition of switching from one valley to another, closed feedback loop 1102 may appropriately increase or decrease peak inductor current Ipk to maintain load regulation within a few switching cycles of control signal Cs (e.g., as limited by a bandwidth of integrator 1112).

Among the advantages of the methods and systems set forth herein are that they may provide a simple and robust control scheme wherein only the inductor current profile is defined based on dimmer phase angle. In addition, in accordance with these methods and systems, there may be minimal transient flicker observed in the output current $i_{OUT}$ when controller 812 causes switching to change from one valley to another, because the compensation carried out by feedback loop 1102 may take immediate action by increasing or decreasing peak inductor current $I_{pk}$ within a few switching cycles to maintain load regulation. Furthermore, the approach employed by these methods and systems may lead to a reduction in power dissipation of switch 808, as compared to existing approaches.

As used herein, when two or more elements are referred to as "coupled" to one another, such term indicates that such two or more elements are in electronic communication whether connected indirectly or directly, with or without intervening elements.

This disclosure encompasses all changes, substitutions, variations, alterations, and modifications to the example embodiments herein that a person having ordinary skill in the art would comprehend. Similarly, where appropriate, the appended claims encompass all changes, substitutions, variations, alterations, and modifications to the example embodiments herein that a person having ordinary skill in the art would comprehend. Moreover, reference in the appended claims to an apparatus or system or a component of an apparatus or system being adapted to, arranged to, capable of, configured to, enabled to, operable to, or operative to perform a particular function encompasses that apparatus, system, or component, whether or not it or that particular function is activated, turned on, or unlocked, as long as that apparatus, system, or component is so adapted, arranged, capable, configured, enabled, operable, or operative.

All examples and conditional language recited herein are intended for pedagogical objects to aid the reader in understanding the disclosure and the concepts contributed by the inventor to furthering the art, and are construed as being without limitation to such specifically recited examples and conditions. Although embodiments of the present disclosure have been described in detail, it should be understood that various changes, substitutions, and alterations could be made hereto without departing from the spirit and scope of the disclosure.

What is claimed is:

1. An apparatus comprising:
    a switching power converter configured to transfer energy from an input of the power converter to a load coupled to the power converter in conformity with a regulated current, the switching power converter comprising a switch and an energy storage device, wherein the regulated current is a function of a switching period of the switching power converter and a peak current of the energy storage device during the switching period; and
    a controller configured to generate a control signal to activate and deactivate the switch in order to control the switching period and the peak current to maintain the regulated current at a desired current level such that:
        if the switching period decreases below a minimum switching period, the controller increases the switching period by a ringing period of a voltage of the switch and increases the peak current to compensate for the increase of the switching period in order to maintain the regulated current; and
        if the peak current increases above a maximum peak current, the controller decreases the switching period by a ringing period of the voltage of the switch and decreases the peak current to compensate for the decrease of the switching period in order to maintain the regulated current.

2. The apparatus of claim 1, wherein the controller is configured to, during the switching period, switch at a minimum magnitude of the voltage during a ringing period of the voltage.

3. The apparatus of claim 1, wherein the energy storage device is an inductor.

4. The apparatus of claim 3, wherein the ringing period of the switch is defined by the inductance of the inductor and a parasitic capacitance of the switch.

5. The apparatus of claim 1, further comprising a dimmer configured to provide electrical energy to the input of the power converter, wherein the peak current is proportional to a conduction period of the dimmer.

6. The apparatus of claim 1, wherein the switching power converter comprises one of a buck converter, a buck-boost converter, and a flyback converter.

7. A method comprising activating and deactivating a switch of a switching power converter in order to control a switching period and peak current of the switching power converter in order to maintain a regulated current of the switching power converter at a desired current level such that:
    if the switching period decreases below a minimum switching period, increasing the switching period by a ringing period of a voltage of the switch and increasing the peak current to compensate for the increase of the switching period in order to maintain the regulated current; and
    if the peak current increases above a maximum peak current, decreasing the switching period by a ringing period of the voltage of the switch and decreasing the peak current to compensate for the decrease of the switching period in order to maintain the regulated current.

8. The method of claim 7, wherein the controller is configured to, during the switching period, switch at a minimum magnitude of the voltage during a ringing period of the voltage.

9. The method of claim 7, wherein the energy storage device is an inductor.

10. The method of claim 9, wherein the ringing period of the switch is defined by the inductance of the inductor and a parasitic capacitance of the switch.

11. The method of claim 7, further comprising providing electrical energy to the input of the power converter with a dimmer, wherein the peak current is proportional to a conduction period of the dimmer.

12. The method of claim 7, wherein the switching power converter comprises one of a buck converter, a buck-boost converter, and a flyback converter.

* * * * *